United States Patent [19]

Houghtaling

[11] 3,944,039
[45] Mar. 16, 1976

[54] CONSUMABLE CARD ACTIVATED APPARATUS

[76] Inventor: John J. Houghtaling, 6080 SW. 104th St., Miami, Fla. 33156

[22] Filed: June 21, 1974

[21] Appl. No.: 481,664

[52] U.S. Cl. .............................................. 194/4 R
[51] Int. Cl.² .......................................... G07F 7/08
[58] Field of Search ............. 194/4 R, 4 C, 4 E, 4 F, 194/4 G, 4 B, 4 D, 5

[56] References Cited
UNITED STATES PATENTS

| | | | |
|---|---|---|---|
| 2,794,869 | 6/1957 | Noregaard | 194/4 R |
| 3,204,741 | 9/1965 | Maxwell et al. | 194/4 B |
| 3,432,017 | 3/1969 | Kliewer | 194/4 R |
| 3,440,606 | 4/1969 | Bayha | 194/4 |
| 3,486,600 | 12/1969 | Tanaka | 194/4 R |
| 3,578,124 | 5/1971 | Flum | 194/4 R |

*Primary Examiner*—Stanley H. Tollberg
*Attorney, Agent, or Firm*—Smythe & Moore

[57] ABSTRACT

A device adapted to be activated when a consumable portion card with consumable unit portions is inserted therein, the insertion of said card and other articles being blocked by a gate operable if a valid consumable portion or unit still remains on said card, the card taking the place of a coin. The device can be used to operate a bed vibrator, turn on a radio or television for a predetermined time, or activate other types of devices hitherto started or operable by coin-operated mechanisms.

5 Claims, 8 Drawing Figures

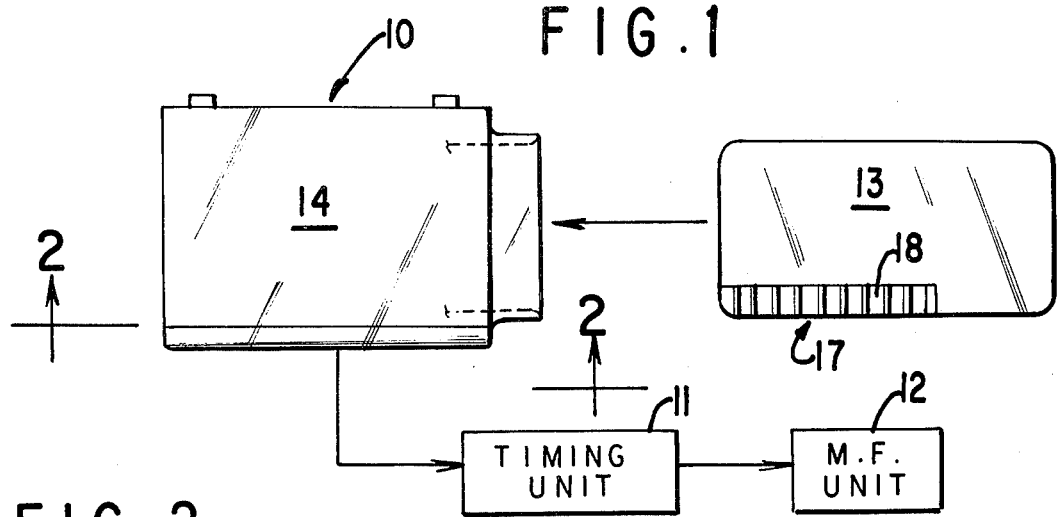
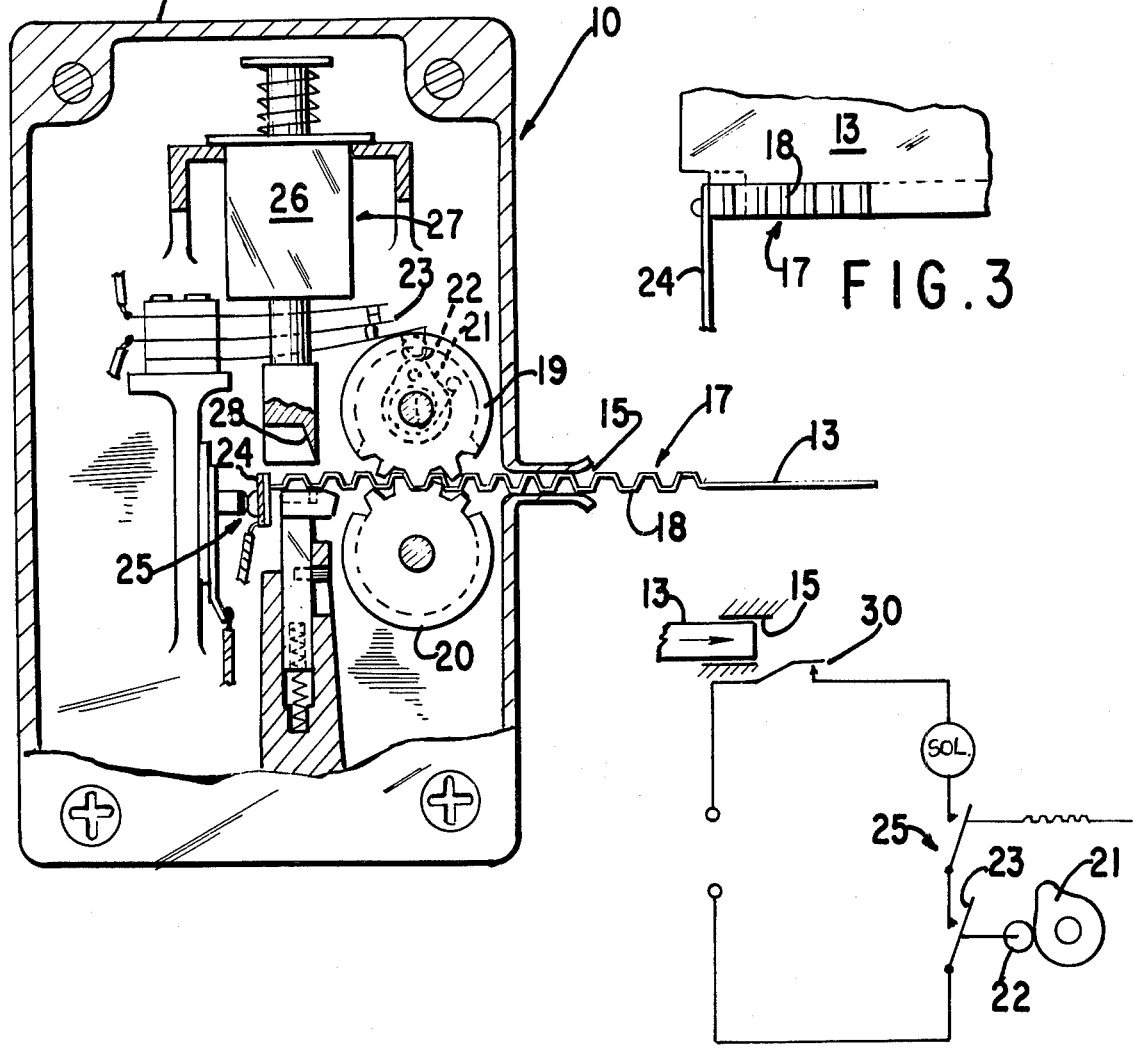

CONSUMABLE CARD ACTIVATED APPARATUS

The invention relates to a consumable card activated device useful to start various mechanisms and especially mechanisms to be energized for a predetermined relatively short time.

As an example of one use of the invention, beds equipped with vibrating units to aid in relaxation, such as shown in U.S. Pat. No. 3,035,572, have been installed and are in general use in many hotels, motels, and the like. The starting of such a vibrating unit has been usually accomplished by the insertion of a coin or token into a timer mechanism. The coin or token causes the timer mechanism to operate the vibratory unit for a predetermined period of time.

Among the problems involved, such coin-actuated devices can accumulate coins which may tempt certain individuals to remove the coins without authorization. In addition, various forms of slugs or other valueless and unauthorized tokens can be inserted into the coin slot of the actuator. In some cases, the slugs may actuate the vibrator. On other occasions, the slugs or forged tokens may result in jamming of the mechanism so as to render the controlled unit inoperative by use of the actuating apparatus. A similar problem exists wherever other types of so-called "coin-operated" devices are concerned, such as vending machines, radios, televisions, openable gates, etc. Cards of various types which have cuts placed therein have been previously used, such as seen in U.S. Pat. Nos. 2,783,865 and 3,209,741.

One of the objects of the invention is to provide an improved apparatus activating or actuating mechanism.

According to one aspect of the present invention, a card-actuated mechanism for controlling the operation of a device, such as a vibrator, may comprise a housing having an insert slot for a card provided with a consumable portion or unit thereon. Means are provided within the housing responsive to indicia, such as physical or magnetic indicia, on the card to permit insertion of the card into the slot. Also within the housing are gate means which are opened by an inserted card but only by a card having proper indicia thereon. The gate will prevent admission of unauthorized articles. A predetermined amount of the consumable portion of the card is cancelled or is cut off by a device actuated in response or conjunction with the gate means.

Other objects, advantages and features of the present invention will become apparent from the accompanying description and drawings, which are merely exemplary.

In the drawings:

FIG. 1 is a top schematic view of a card actuator device according to the present invention together with schematic indication of a timing unit and vibrator unit operable thereby;

FIG. 2 is a sectional elevational view taken along the line 2—2 of FIG. 1;

FIG. 3 is a fragmentary top plan view of one form of the consumable portion or unit of a card employed to activate the device;

FIG. 4 is an electrical circuit diagram showing schematically an operating circuit for a timer;

Figure 5:
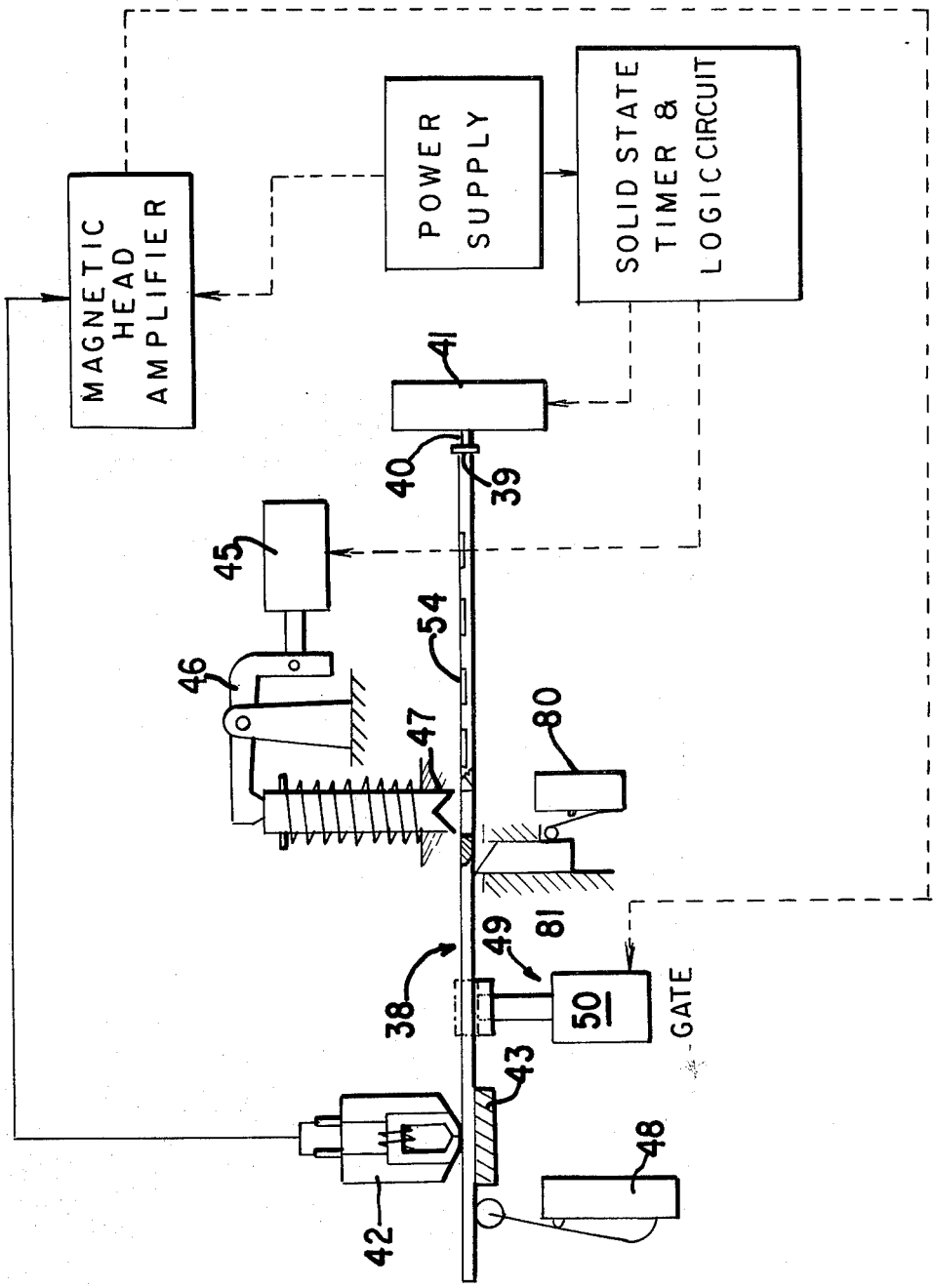
FIG. 5 is a vertical schematic view of a modification showing a card with a magnetic strip completely inserted therein and the various components with respect thereto.

As will appear hereafter, the card-activated mechanism can take various forms and can be used for differernt purposes.

Proceeding next to the drawings wherein like reference symbols indicate the same parts througout the various views, one embodiment of the present invention for use in conjunction with activating or actuating a bed vibrator for a predetermined time first will be described in detail.

As may be seen in FIG. 1, actuating or actuator device 10 is connected to timing unit 11 for a vibratory unit 12 which in turn is mounted on a bed or similar structure. Merely by way of example, such a unit can be as shown in U.S. Pat. No. 3,035,572. The card for energizing or operating the actuator is indicated at 13. The card may be of thin plastic similar to the commonly used credit cards but made of thinner material.

Actuator 10 is provided with housing 14 (FIG. 2) having a card insertion slot 15. Card 13 is provided with a consumable portion 17 (FIG. 1) formed along a longitudinal edge thereof and adjacent a corner. In this form, the consumable portion may have physical indicia such as a crimped, embossed or scalloped unit 18. Crimped or embossed units 18 are essentially in the shape of a square wave but may be provided with other suitable shapes. The consumable portion 17 is divided into a number of units 18, each of which is usable to provide a single use of vibrator 12. One unit of the consumable portion is removed each time the card is used to actuate the vibrator until all of the consumable portion has been removed. It is then necessary for the user to acquire a new duly authorized card entitling him to another predetermined number of uses.

Positioned within the housing 14 to one side of the slot 15 so as to receive the consumable portion 17, there is a pair of meshing gears 19 and 20 whose gear teeth are shaped to conform with the crimped portion 17 of the card. In addition, there is play or clearance between the meshing teeth corresponding to the thickness of the card. Therefore, insertion of a proper card having the authorized consumable portion will cause the meshing gears 19 and 20 to rotate as the card is inserted therein. Carried on gear 19 is a cam 21 which will engage a cam roller 22 to close switch 23.

Continued insertion of the card into slot 15 will cause the leading edge of the card to engage stop 24 and move the stop to close switch 25. The closing of switch 25 following closing of switch 23 will energize solenoid 26 of a cutter device indicated generally at 27 which is provided with a cutter blade or device 28. Energization of cutter 27 will cause blade 28 to move downwardly and to sever a predetermined portion of the consumable portion 17 or unit 18 of the card. Simultaneously with actuation of cutter device 28, timing unit 11 will be started and the vibrator 12 will begin to operate for a predetermined period of time in accordance with the setting of the timer.

As a further provision against use of unauthorized or improper cards, slot 15 may be provided with spring-biased interlock switch 30, shown schematically in FIG. 4, which will be actuated only by a proper size card 13 closing switch 30. The closing of switches 23, 25 and 30, as described, will complete the operating circuit for the timing unit which will then operate the vibrator for the predetermined time. Also, the closing of switches by a valid card could be used to initiate other functions.

Figure 8:
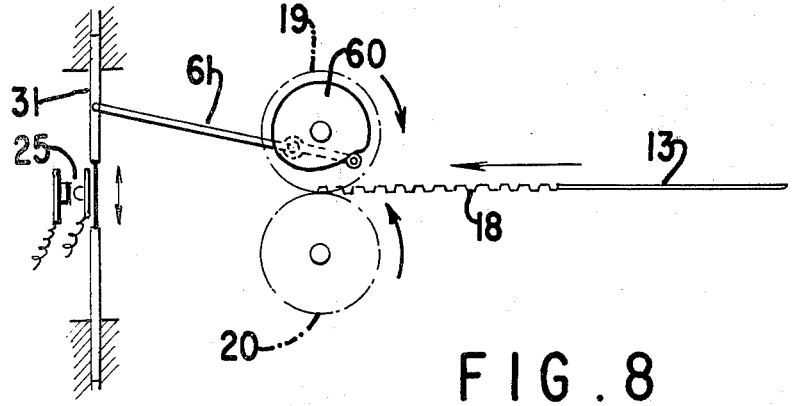
FIG. 8 is a fragmentary schematic view of a gate operating means.

If the card has had all of its consumable units used, gate 31 (FIG. 8) will not be opened unless a card with unconsumed units is employed. When the card still has consumable units to operate the gears 19 and 20, gear or cam 60, operated on arm 61, will be moved (FIG. 8) to raise gate 31. If there are no consumable remaining units, gears 19 and 20 will not be operated so that the gate 31 will not be raised. The length of a consumable unit 18 of the card must be so related to the distance from gears 19, 20 so that when one unit is still left, it will be able to turn the gears so as to raise the gate and still permit the edge of the last unit to raise the gate and actuate the stop 24 and related parts to cut off the last portion and also to start the timer. Such requires the crimped portion to extend to the right of the last unconsumed unit to permit the card to make a full travel toward the gate and stop. The gate, stop and related mechanism are arranged so that the solid or flat part of the card can move past as the card is moved to the left.

In another form, as seen schematically in FIG. 5, the card consumable portion may comprise a magnetic tape or strip divided into units wherein a unit may be physically cut off or deleted for each use.

The card 38 is shown in a fully inserted position with leading edge 39 of the card in contact with switch operator 40 of an end-of-travel switch 41. This modification further comprises a magnetic head 42 positioned above a pressure pad 43 which acts against the underside of the card 38 to urge the magnetic tape portion thereof against the magnetic head. There is also provided a solenoid 45 which is connected through linkage 46 for actuating an embossing punch 47 which embosses a strip to provide a visual indication of used portions of the card.

A card-in-position switch 48 is located just inside of the slot so as to be actuated whenever a card having a thickness less than the width of the slot is inserted. Switch 48 is connected (not shown) into the electronic control circuit to advise the circuit whenever a card has been inserted or removed relative to the slot. As an example, the width of the slot can be 0.021 inch which will readily accommodate a card having a thickness of 0.018 inch. Since the usual embossed credit cards in use today have a thickness of 0.030 inch, it is apparent that such cards can not be inserted into such a slot.

The gate 49 functions to stop all invalid or used cards and other foreign material from being inserted into the device. Solenoid 50 actuating the gate is energized only after the proper signal has been read by magnetic head 42. In the event a card with no magnetic strip thereon is inserted into the device, no signal will be generated so that gate 49 will remain closed. If a card with a magnetic strip thereon, but without the correct coded information, is inserted, no signal will be generated and the gate will not open. Should a card with a magnetic strip, of which all the units have been used so that the card is invalid, be inserted, no signal will be generated and the gate will remain closed. The gate will be opened only when the head generates an electric signal from a valid card having a magnetic strip and having valid portions thereon to actuate or energize magnetic head 52.

Figure 7:
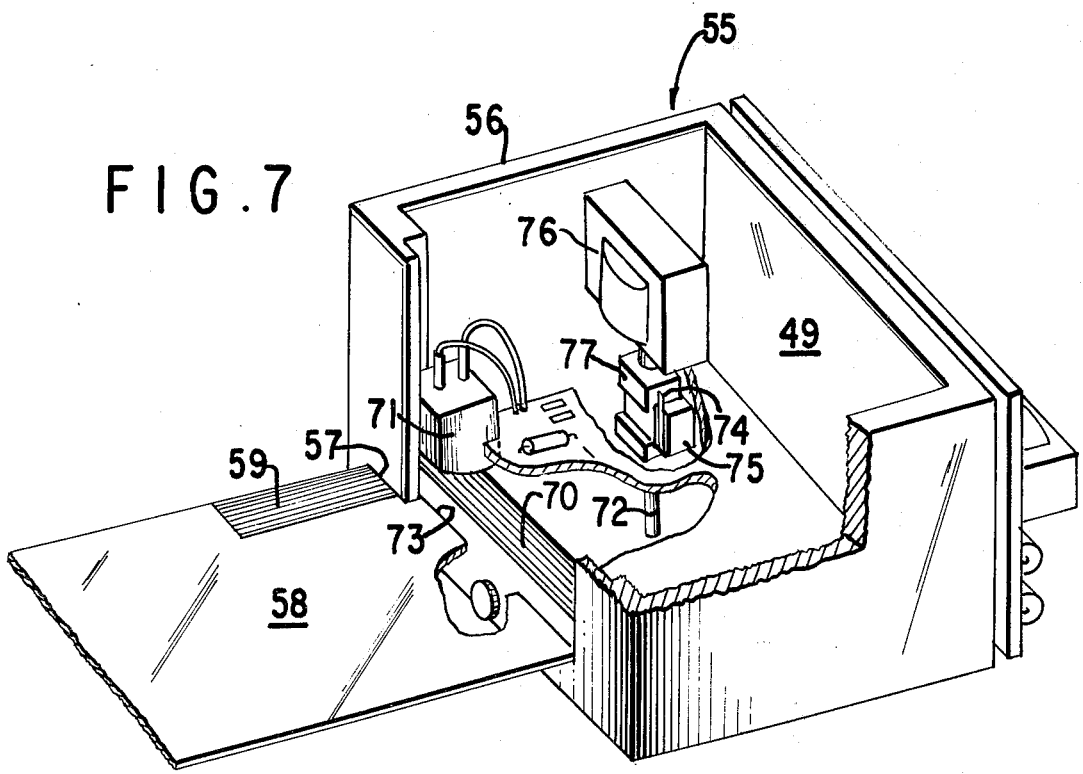
FIG. 7 is a perspective view of another modification.
Figure 6:
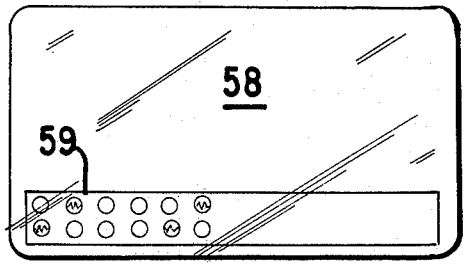
FIG. 6 is a plan view of the card used in the form shown in FIG. 5.

The card can have any suitable magnetic code thereon such as seen schematically at 59 in FIG. 7. In one manner of operation, a detent or feeler switch 80 can be used. When the card is used the first time, if the magnetic code or information indicates that it is a valid card, the gate will be opened and when the leading edge 39 reaches switch 40, the punch 47 will be actuated and the timer or apparatus being activated energized. For the next operation, detent 81 of switch 80 will enter the punched hole 82 and cause operation of the punch for the next hole to be punched. At the same time, the timer will be actuated by switch 80 instead of using the end-of-travel switch 40.

In another form as seen in FIG. 7, the card consumable units may comprise a magnetic tape or strip divided into units wherein a unit may be either physically cut off for each use or a unit may be magnetically erased. The unit in FIG. 7 is indicated generally at 55 and comprises a housing 56, having a slot 57, to receive a card 58 whose consumable portion consists of a magnetic tape or strip 59 located in one corner and along a longitudinal edge thereof. The width of the slot 57 is made such that an authorized card closely fits the slot. Cards having a greater thickness or width will not be able to be inserted into the slot.

Card roller 70 within the slot is positioned below magnetic head 71 which is responsive to the magnetic strip 59 for energizing a solenoid switch for actuation of gate 72. Opening of gate 72 will permit the further insertion or movement of the card 58 into the slot until leading edge 73 of the consumable portion engages an actuator blade 74 of switch 75. As switch 75 is closed, a notching solenoid 76 is energized which causes card notcher or cutter blade 77 to remove or cut off one of the units of the magnet strip. At the same time that the notching solenoid is energized, an electrical pulse is sent to actuate the timer or other device.

After the card is notched or a unit cut off, it must be completely withdrawn and reinserted to activate the timer accumulator for further actuation of the apparatus to which the unit is attached. As mentioned, such apparatus may comprise a bed vibrator, a dispenser for a wide variety of articles, or some other form of apparatus.

After all of the units of the consumable portion have been removed, leading edge of unnotched edge 73 of the card will contact the back wall 49 of the unit. This will occur before the notched or cancelled portion of the card engages the switch 75.

In order to prevent removal of the card and cutting off a portion of the card to permit insertion of the card, the length of the magnetic strip is equal only to the number of units thereon. Thus, after all of the units have been cancelled, cutting off of the leading edge of the unnotched portion of the card will be to no avail since the complete removal of the magnetic tape will not energize the solenoid for unblocking the gate.

Notching solenoid 76 and cutter 77 can be replaced by a magnetic head which erases magnetically a unit of the magnet strip. Thus, the erasing means of the cutter is an effective device for cancelling a unit of the consumable portion corresponding to each use of the card. In the event magnetic erasing means are employed, a form of a notching or punching device may be used in conjunction therewith to indicate the units of the consumable portion which have been magnetically erased and are therefore no longer usable.

The details of the logic circuitry and timer can be chosen as needed.

It should be apparent that details of construction and arrangement can be varied without departing from the invention except as set forth in the appended claims.

What is claimed is:

1. In a card-operated device for activating an apparatus, the combination including a housing having an insert slot for receiving a card with a consumable portion which is crimped and extends longitudinally along an edge of the card and is subdivided into a plurality of units, gate means within said housing normally blocking the insertion of a card therein to an operative position, means responsive to a portion of said consumable portion for opening said gate means to permit insertion of said card, gear means having play between the meshing teeth corresponding to the thickness of the crimped portion of the card responsive to an unconsumed part of said consumable portion to provide a signal for activating said apparatus, and means responsive to said consumable portion for cancelling one of said units each operation, whereby said card can only be used the number of times corresponding to the remaining number of units on said consumable portion.

2. In a card-operated device for activating an apparatus, the combination including a housing having an insert slot for receiving a card with a consumable, magnetically encoded strip means magnetically subdivided into a plurality of units, means responsive to an unconsumed part of said consumable, magnetically encoded strip means to provide a signal for activating said apparatus, and means responsive to said consumable, magnetically encoded strip means for physically removing one of said units in each operation, whereby said card can only be used the number of times corresponding to the remaining number of units on said consumable, magnetically encoded strip means.

3. In a card-operated device for activating an apparatus, the combination including a housing having an insert slot for receiving a card with a consumable, continuous magnetically encoded strip means subdivided into a plurality of magnetic units, gate means within said housing normally blocking the insertion of a card therein to an operative position, means responsive to a portion of said consumable, continuous magnetically encoded strip means for opening said gate means to permit insertion of said card, means responsive to an unconsumed part of said consumable, continuous magnetically encoded strip means to provide a signal for activating said apparatus, and means responsive to said consumable, continuous magnetically encoded strip means for removing one of said units in each operation, whereby said card can only be used the number of times corresponding to the remaining number of magnetic units on said consumable, continuous magnetically encoded strip means.

4. In a card-operated device as claimed in claim 3 wherein the card is flat and has a thickness in the range of 0.018 inch.

5. In a card-operated device as claimed in claim 1 wherein said gate means is connected to said gears and is operable thereby when an unconsumed portion of said card operates said gate means.

* * * * *